United States Patent Office 2,921,087
Patented Jan. 12, 1960

2,921,087

PROCESS FOR PRODUCING DIALKYL PHOSPHORIC ACIDS

Harry W. Coover, Jr., and Marvin A. McCall, Kingsport, Tenn., assignors to Eastman Kodak Company, Rochester, N.Y., a corporation of New Jersey No Drawing. Application December 19, 1957
Serial No. 703,747

6 Claims. (Cl. 260—461)

This invention relates to a new and improved process for the production of dialkyl phosphoric acids. In a specific aspect this invention relates to a new and improved process for producing dialkyl phosphoric acids of high purity by reaction of dialkyl phosphites with nitrogen dioxide.

Dialkyl phosphoric acids have been prepared heretofore by a variety of procedures but each one of the prior art methods of preparing dialkyl phosphoric acids has been known to suffer from an outstanding disadvantage. For example, dialkyl phosphoric acids have been prepared by the reaction of an aliphatic alcohol with phosphorus pentoxide. The reaction is represented by the following equation:

$$3ROH + P_2O_5 \rightarrow (RO)P(O)(OH)_2 + (RO)_2P(O)OH$$

It is quite apparent that this prior art process yields a mixture of mono- and dialkyl phosphoric acids, and at the same time, a minor amount of the tertiary esters as well as some phosphoric acid is produced. Thus, in order to obtain the dialkyl phosphoric acid in a relatively high purity, it is necessary to subject the reaction mixture to additional purification procedures. Another method of preparing dialkyl phosphoric acids involves the esterification of aliphatic alcohols by "sirupy" phosphoric acid but this reaction also involves the production of a reaction mixture similar to that discussed above. When this procedure is used, it is obviously necessary to employ extensive purification methods in order to obtain a relatively pure dialkyl phosphoric acid. Another prior art procedure involves the hydrolysis of linear polyphosphoric acids or their salts to produce phosphoric acid esters but the product generally contains a high ratio of the primary ester unless very pure tetraalkyl pyrophosphoric acids are used as the initial reactants.

Still another method for producing dialkyl phosphoric acids involves the hydrolysis of halophosphates or trialkyl phosphates in an aqueous medium, but the reaction is very difficult to control and we are confronted with the difficult problem of isolating the dialkyl phosphoric acids from the aqueous hydrolysis medium. It has been suggested that dialkyl hydrogen phosphites can be oxidized with air or oxygen but in the past it has been found that the dialkyl hydrogen phosphites do not oxidize readily in this manner because of the keto structure of the phosphites. It has also been suggested that dialkyl hydrogen phosphites can be oxidized to form dialkyl phosphoric acids in an aqueous or "wet" medium, but such procedures have been quite unsatisfactory because of the extensive hydrolysis of the initial reactants.

It is an object of this invention to provide a new and improved process for the preparation of dialkyl phosphoric acids wherein the difficulties encountered in prior art procedures are avoided. It is another object of this invention to provide a new and improved process for the production of dialkyl phosphoric acids of high purity wherein extensive purification procedures of the reaction mixture are not required. Further and additional objects of this invention will be quite apparent from the following detailed description of this invention.

In accordance with this invention it has been found that dialkyl phosphoric acids of relatively high purity can be prepared by the reaction of a dialkyl hydrogen phosphite with nitrogen dioxide. The reaction involved in this process is represented by the following equation:

$$2(RO)_2P(O)H + N_2O_4 \rightarrow 2(RO)_2P(O)OH + 2NO$$

wherein R is an alkyl radical containing from 1–10 carbon atoms. The reaction proceeds smoothly to the production of the dialkyl phosphoric acid and nitric oxide which is volatile under the conditions for the reaction. Accordingly, the nitric oxide is in a vapor form and in that form it is readily removed from the reaction mixture. It is a further outstanding feature of this invention that the nitric oxide produced in the process can be recovered and oxidized to regenerate nitrogen dioxide. It is thus quite apparent that although nitrogen dioxide is employed as one of the reactants in the process, only air or oxygen is consumed in converting the dialkyl hydrogen phosphite to dialkyl phosphoric acid. Thus, the reaction is quite economical and since the only contaminating reaction product is removed by vaporization, it is possible to produce the dialkyl phosphoric acid in high purity.

We have found further that the reaction for producing dialkyl phosphoric acids in accordance with our process proceeds within an operable temperature range of from 0–200° C. The preferred temperature range varies from 25–150° C. The dialkyl hydrogen phosphites that are employed in our process are readily obtainable from the reaction of the appropriate aliphatic alcohol with phosphorus trichloride. Since this reaction also produces a product of high purity, the product of our process is not contaminated by impurities in the initial reactants.

If desired, the reaction of this invention can be carried out in the presence of solvents that are used to dilute the liquid nitrogen dioxide. Among the solvents that can be used are nitric acid, sulfuric acid, chloroform, carbon disulfide and the like. However, solvents are ordinarily not essential to our process and we prefer to carry out the reaction in the absence of a solvent. In that manner we avoid contamination of the reaction product and undesirable purification procedures. If a diluent is used, we prefer to employ air, nitrogen or oxygen as the diluent for the gaseous nitrogen dioxide.

The dialkyl hydrogen phosphite and nitrogen dioxide react in a 2:1 molar ratio, and it is desirable to use that molar ratio of reactants. However, other ratios of reactants can be used. For example, an excess of nitrogen dioxide can be used to insure complete conversion of the nitrogen dioxide, and any excess unreacted nitrogen dioxide can be readily removed from the reaction product by heating and vaporization.

The following examples are illustrative of the manner in which high purity dialkyl phosphoric acids can be produced in accordance with our invention.

Example 1

In this example apparatus similar to that described in Industrial and Engineering Chemistry, vol. 45, No. 9, 2068 (1953), was used. The apparatus consisted of two 3-necked flasks with one flask serving as a vaporizer for the liquid nitrogen dioxide and the other flask serving as a reactor for the reaction of a dialkyl hydrogen phosphite and vaporized nitrogen dioxide. The vaporizer was equipped with a tube through which dry air was introduced at a controlled rate over the surface of the liquid nitrogen dioxide. The vaporizer also contained a thermometer extending below the surface of the liquid nitrogen dioxide and an exit gas tube. The latter tube of the vaporizer was connected to a bubbler in the flask employed as a reactor and containing the dialkyl hydrogen phosphite. The reactor flask was equipped with an exit gas tube through which the nitric oxide produced in the process and unreacted nitrogen dioxide escaped. The escaping exit gases were condensed in either a cold trap or a suitable scrubbing tower.

In carrying out the reaction 55.2 grams (0.16 mole) liquid nitrogen dioxide was placed in the vaporizer flask and a slow stream of air was passed over the surface of the liquid nitrogen dioxide. The stirrer in the reactor flask was started and 92 grams of di-2-ethylhexyl hydrogen phosphite was placed in the reactor flask. The air rate was then increased to 500–700 cc. of air per minute to produce a steady bubbling action in the reaction flask. The vaporizer flask was warmed occasionally to increase the amount of nitrogen dioxide being picked up by the air stream. The boiling point of nitrogen dioxide is 21.3° C. During the reaction the temperature of the di-2-ethylhexyl hydrogen phosphite in the reaction flask rose gradually from room temperature to about 100° C. The temperature of the reaction flask was controlled at about 100° C. by external cooling and by controlling the amount of nitrogen dioxide vapor coming from the vaporizer flask.

The reaction was continued for 1½–3 hours and at the conclusion of the reaction the product in the reaction flask was warmed on a steam bath to permit vaporization of any dissolved nitric oxide and any unreacted nitrogen dioxide in the reaction flask. The product was finally heated to about 100° C. under 1–2 mm. pressure to remove any remaining volatile impurities. The product obtained in this manner was di-2-ethylhexyl phosphoric acid, $n_D^{23}$ 1.4435.

Example 2

In a procedure similar to that described in Example 1 dimethyl hydrogen phosphite was reacted to form dimethyl phosphoric acid.

Example 3

In a procedure similar to that described in Example 1 diethyl hydrogen phosphite was reacted to form diethyl phosphoric acid.

Example 4

In a procedure similar to that described in Example 1 dipropyl hydrogen phosphite was reacted to form dipropyl phosphoric acid.

Example 5

In a procedure similar to that described in Example 1 dibutyl hydrogen phosphite was reacted to form dibutyl phosphoric acid.

Example 6

In a procedure similar to that described in Example 1 di-decyl hydrogen phosphite was reacted to form di-decyl phosphoric acid.

We claim:

1. The improved method for producing a dialkyl phosphoric acid of high purity which comprises reacting a dialkyl hydrogen phosphite, wherein the alkyl radicals contain from 1–10 carbon atoms, with nitrogen dioxide at a temperature within the range of 0–200° C.

2. The method for producing di-2-ethylhexyl phosphoric of high purity which comprises reacting di-2-ethylhexyl hydrogen phosphite with nitrogen dioxide at a temperature within the range of 25–150° C.

3. The method for producing dimethyl phosphoric acid of high purity which comprises reacting dimethyl hydrogen phosphite with nitrogen dioxide at a temperature within the range of 25–150° C.

4. The method of producing diethyl phosphoric acid of high purity which comprises reacting diethyl hydrogen phosphite with nitrogen dioxide at a temperature within the range of 25–150° C.

5. The method for producing dipropyl phosphoric acid of high purity which comprises reacting dipropyl hydrogen phosphite with nitrogen dioxide at a temperature within the range of 25–150° C.

6. The method for producing dibutyl phosphoric acid of high purity which comprises reacting dibutyl hydrogen phosphite with nitrogen dioxide at a temperature within the range of 25–150° C.

References Cited in the file of this patent

UNITED STATES PATENTS 2,059,084   Buchheim _____ Oct. 27, 1936